US010031966B2

(12) United States Patent
Kandur Raja et al.

(10) Patent No.: US 10,031,966 B2
(45) Date of Patent: Jul. 24, 2018

(54) SYSTEM AND METHOD FOR SORTING PHONEBOOK CONTACTS BASED ON CONTEXT WEIGHTAGE AND INCENTIVES

(71) Applicant: Samsung Electronics Co. Ltd., Suwon-si, Gyeonggi-do (KR)

(72) Inventors: Barath Raj Kandur Raja, Bangalore (IN); Sridhar Rajiv Kavuri, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 510 days.

(21) Appl. No.: 13/936,559

(22) Filed: Jul. 8, 2013

(65) Prior Publication Data
US 2014/0012860 A1    Jan. 9, 2014

(30) Foreign Application Priority Data
Jul. 9, 2012   (IN) .......................... 2766/CHE/2012

(51) Int. Cl.
*G06F 17/30*  (2006.01)
*G06F 17/00*  (2006.01)
*H04M 1/2745* (2006.01)

(52) U.S. Cl.
CPC ..... *G06F 17/30616* (2013.01); *H04M 1/274583* (2013.01)

(58) Field of Classification Search
CPC ......... H04M 1/274516; H04M 3/4931; H04M 1/2745; H04M 1/274583; H04M 1/27455; H04M 1/274508; H04M 1/274533; H04M 1/576; H04M 1/274566; H04M 1/72552; H04M 1/274558; H04M 1/72519; H04M 1/72522; H04M 1/72583; H04M 2242/22; H04M 3/42068
See application file for complete search history.

(56) References Cited

U.S. PATENT DOCUMENTS

| | | | |
|---|---|---|---|
| 6,606,381 B1* | 8/2003 | Wunsch ......... | H04M 1/274583 379/142.06 |
| 7,249,126 B1 | 7/2007 | Ginsburg et al. | |
| 7,280,648 B2* | 10/2007 | Matsunaga ..... | H04M 1/274583 379/142.01 |
| 8,001,120 B2 | 8/2011 | Todd et al. | |
| 2003/0148790 A1* | 8/2003 | Pappalardo ..... | H04M 1/274525 455/558 |
| 2006/0035632 A1 | 2/2006 | Sorvari et al. | |
| 2006/0085415 A1* | 4/2006 | Jian .................. | G06F 17/30911 |

(Continued)

FOREIGN PATENT DOCUMENTS

| | | |
|---|---|---|
| CN | 101032155 A | 9/2007 |
| CN | 101889430 A | 11/2010 |

*Primary Examiner* — Yicun Wu
(74) *Attorney, Agent, or Firm* — Jefferson IP Law, LLP

(57) ABSTRACT

The method and system for sorting the phonebook contacts by finding the weight of contacts for each application based on contact incentives and sorting the applications by measuring the weight of the applications based on application incentives is provided. The contact incentives can be identified for each application and the method calculates weight of contacts for each application. The method identifies the application incentives, and calculates the weight of each application. Based on the weight of contacts and the weight of application, the method normalizes sorts the contacts in phonebook.

16 Claims, 15 Drawing Sheets

(56) References Cited

U.S. PATENT DOCUMENTS

| | | |
|---|---|---|
| 2007/0219984 A1* | 9/2007 | Aravamudan .... G06F 17/30035 |
| 2008/0033946 A1 | 2/2008 | Bhogal et al. |
| 2008/0056269 A1 | 3/2008 | Madhani et al. |
| 2009/0111447 A1 | 4/2009 | Nurmi |
| 2010/0062753 A1 | 3/2010 | Wen et al. |
| 2010/0082693 A1 | 4/2010 | Hugg et al. |
| 2010/0330972 A1 | 12/2010 | Angiolillo |
| 2011/0129076 A1* | 6/2011 | Stanojevic ............ H04M 15/00 379/114.1 |
| 2011/0231407 A1 | 9/2011 | Gupta et al. |

* cited by examiner

| SNS 301 | Chat 302 | Calendar 303 | Gallery 304 | Messenger 305 |
|---------|----------|--------------|-------------|---------------|
| Joys    | Steve    | Alicia       | James       | David         |
| Adam    | Jack     | Nick         | Craig       | Ricky         |
| Alicia  | Levis    | Lee          | John        | Mark          |
| Chris   | Will     | Smith        | Miles       | Alicia        |
| Rahul   | Roger    | Joys         | Sachin      | Leo           |

FIG. 3

| SNS 301 | Chat 302 | Calendar 303 | Gallery 304 | Messenger 305 | $N_{WC}$ |
|---|---|---|---|---|---|
| Joys | Steve | Alicia | James | David | 5 |
| Adam | Jack | Nick | Craig | Ricky | 4 |
| Alicia | Levis | Lee | John | Mark | 3 |
| Chris | Will | Smith | Miles | Alicia | 2 |
| Rahul | Roger | Joys | Sachin | Leo | 1 | sorted ↓

FIG. 6

| Applications | Weight | $N_{WA}$ |
|---|---|---|
| SNS 301 | 125 | 10 |
| Chat 302 | 78 | 9 |
| Calendar 303 | 65 | 8 |
| Gallery 304 | 60 | 7 |
| Messenger 305 | 25 | 6 | sorted ↓

FIG. 8

| Applications | $N_{WA}$ | $N_{WA} * MF$ |
|:---:|:---:|:---:|
| SNS 301 | 10 | 50 |
| Chat 302 | 9 | 45 |
| Calendar 303 | 8 | 40 |
| Gallery 304 | 7 | 35 |
| Messenger 305 | 6 | 30 | sorted ↓

FIG. 13

SYSTEM AND METHOD FOR SORTING PHONEBOOK CONTACTS BASED ON CONTEXT WEIGHTAGE AND INCENTIVES

PRIORITY

This application claims the benefit under 35 U.S.C. § 119(a) of a Indian patent application filed on Jul. 9, 2012 in the Indian Patent Office and assigned Serial No. 2766/CHE/2012, the entire disclosure of which is hereby incorporated by reference.

BACKGROUND OF THE INVENTION

1. Field of the Invention

The present invention relates to sorting phonebook contacts. More particularly, the present invention relates to sorting phonebook contacts by identifying a set of contacts for each application based on contact incentives, and identifying the weights of an application based on application incentives.

2. Description of the Related Art

Communication devices, particularly mobile or portable electronic devices, have become increasingly popular and prevalent in society for communication purposes. Many users use mobile or portable computer devices as their primary means of communication, and carry such devices with them constantly. Mobile electronic devices can perform various functions such as a phonebook function, a cellular phone service function, a Voice over Internet Protocol ("VoIP") phone service function, functions associated with various software applications stored thereon, an email access function, functions associated with Internet capabilities, calendar functions, a music playback function, a video playback function, and the like.

Users typically utilize phonebook functionality to select contacts with whom the users wish to communicate. A list of contacts generally includes contact names, addresses, phone numbers, and e-mail addresses. Phonebook functionality also includes a sorting function that enables contacts to be organized in a particular manner. For example, the contacts may be sorted and organized such that the user can find the telephone number of an individual by scrolling through the names and telephone numbers on a display. According to the related art, the user may then instruct the electronic device to dial the number by pressing a button.

According to the related art, if a user wants to find a particular contact using the phonebook functionality of an electronic device, then the user has to scroll or navigate the contact list until the entry is found. To some extent, the phonebook contacts are arranged and accessed using the existing features. The user can sort or group the phonebook based on attributes such as first name, family name, date, and the like. According to the related art, the user may be given an option to select a character using hanging bar so that user can jump to a corresponding section of the phonebook. The user may refer to a contact register for quickly accessing a contact. For example, the contact register may correspond to a list for missed, dialed, received, and/or recent calls list, a list for sent and/or received SMS, and the like.

However, according to the related art, accessing the contact entries can be very tedious and time consuming. For example, accessing contact entries may involve performing lookups, performing several key presses, typing on existing keyboard input mechanisms, and the like. Further, phonebooks are filled with contacts with whom the user infrequently contacts. Such contacts are stored and displayed alongside contacts with whom the user contacts on a much more frequent basis. Consequently, according to the related art, the congested nature of the phonebook hampers the access to the highly used contacts.

Due to abovementioned reasons, it is evident that the existing system for accessing the contacts in the phonebook is cumbersome. Therefore, there is a need for a system which overcomes the deficiencies described hereinabove and enables the user with a quick and more convenient mode of accessing the phonebook contacts.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the abovementioned problems and/or disadvantages and to provide at least the advantages described below. Accordingly, an aspect of the present invention is to provide a method and system for sorting contacts in a phonebook based on contact incentives and application incentives.

An aspect of the present invention is to provide a method to determine contact incentives by application-wise listing of incentives of each contact(s) and/or allow weightage based ordering within the contact incentives.

Another aspect of the present invention is to provide a method to determine the application incentives based on application attributes and/or allow weightage-based ordering within the application incentives.

Another aspect of the present invention is to provide a method and system to sort the contacts in the phonebook based on cumulative weightage which uses the weight of the contacts found using contact incentives and weight of the applications found using application incentives.

In accordance with an aspect of the present invention, a method for sorting phonebook contacts in a communication device is provided. The method includes identifying contact incentives of at least one application in the communication device, calculating a weight of the contacts of the at least one application using the identified contact incentives, identifying application incentives for the at least one application in the communication device, calculating a weight of the at least one application based on the identified application incentives, and sorting the contacts based on the weight of the contacts and the weight of the at least one application.

In accordance with an aspect of the present invention, a communication device for sorting the phonebook contacts is provided. The device includes an integrated circuit further comprising at least one processor, and at least one memory having a computer program code within the circuit, wherein the at least one memory and the computer program code configured to work with the at least one processor cause the device to identify contact incentives of at least one application, calculate a weight of the contacts of the at least one application using the identified contact incentives, identify application incentives for the at least one application, calculate a weight of the at least one application based on the identified application incentives, and sort the contacts based on the weight of the contacts and the weight of the at least one application.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 illustrates a set of contacts for each application according to an exemplary embodiment of the present invention;

FIG. 6 illustrates weightage assigned to a set of contacts for each application according to an exemplary embodiment of the present invention;

FIG. 8 illustrates weightage assigned to each application according to an exemplary embodiment of the present invention;

FIG. 13 illustrates a diagram of sorted applications based on a multiplication factor according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
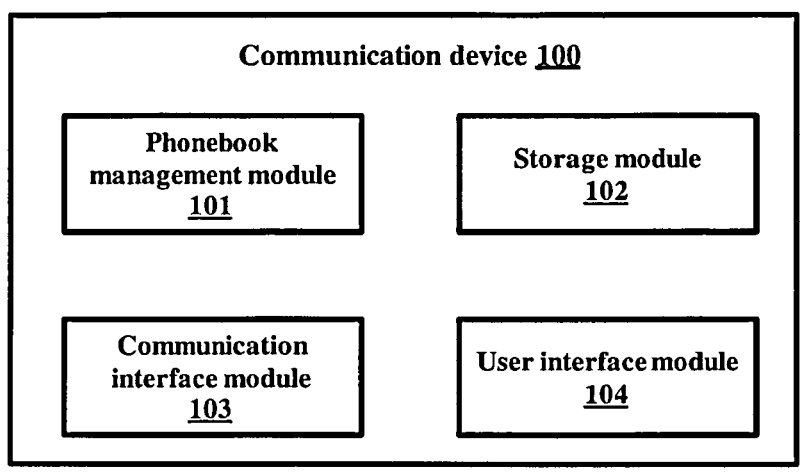
FIG. 1 illustrates a general block diagram of a communication device, according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The exemplary embodiments of the present invention achieve a method and system of sorting contacts in a phonebook based on contact incentives and application incentives. The contact incentives include application-wise listing of incentives of each contact(s) and/or allow weightage-based ordering within the contact incentives. The contact incentives and weightage-based ordering are determined based on usage of one or more contacts in the phonebook with respect to different applications, interaction of one or more contacts with the applications of a user, interaction with each application by a contact, interaction with different entities of applications by contact(s), status of contact(s) in each applications, participant(s) of each applications, usage of one or more contacts or contact links who are not participants during the conversation among two or more contacts, and all other incentives which are used for monitoring the user as well as user's contact(s). The contact incentives allow taking into account the parameters with which the user is not involved.

According to exemplary embodiments of the present invention, the weight of the contacts for each application is determined using contact incentives which involves identifying contact incentives, normalizing the contact incentives, weighing each contact based on contact incentives for each application, finding the normalized weight for contacts across applications if the incentives are not normalized, and comparing the final weights.

According to exemplary embodiments of the present invention, the method determines the application incentives that are used in ordering among the applications itself. The application incentives are calculated based on application attributes, an amount of time an application is available in memory, finding an application from which the phonebook is launched, a number of times phonebook is accessed from each application, a user intention, and all other attributes which help in measuring the weight of the applications.

According to exemplary embodiments of the present invention, the method weighs an application by identifying application incentives, weighing each application based on application incentives, and comparing the final weights.

According to exemplary embodiments of the present invention, the method sorts the contacts based on cumulative weightage which uses the weight of the contacts found using contact incentives and weight of the applications found using application incentives.

FIG. 1 illustrates a general block diagram of a communication device, according to an exemplary embodiment of the present invention.

Referring to FIG. 1, a communication device 100 comprises a phonebook management module 101, a storage module 102, a communication interface module 103, and a User Interface (UI) module (e.g., a display module) 104. The phonebook management module 101 comprises the entire contact list stored by the user of the communication device 100.

According to exemplary embodiments of the present invention, the user can organize the contacts into groups such as family, coworkers, friends, and the like. The phonebook management module 101 stores the user organized groups contacts and whenever the user wants to perform some actions with the contacts organized in groups, the phonebook management module 101 helps the user to perform such actions. According to exemplary embodiments of the present invention, the actions may correspond to calling a contact in the family group, sending a message to a contact in the friends group, and/or the like.

The storage module 102 stores all the phonebook contacts in memory. According to exemplary embodiments of the present invention, the storage module 102 can be internal memory or external memory.

The communication interface module 103 interfaces different actions performed by the user with the service provider. If a user selects a contact from the phonebook and sends a message to the selected contact, then the communication interface module 103 sends the message to the contact through the service provider. According to exemplary embodiments of the present invention, the communication interface module 103 acts as a bridge between the communication device 100 and the service provider.

The user interface module 104 displays the content to the user. According to exemplary embodiments of the present invention, the user interface module 104 displays the contacts list in the phonebook and if the user selects a particular contact in the list, then the user interface module 104 can display the options to the user to perform some actions with the user. The actions can be a sending Short Message Service (SMS) message, a voice call, a skype call, and the like.

According to exemplary embodiments of the present invention, the communication device 100 can be a mobile phone, Personal Digital Assistant (PDA), a tablet, a laptop, a Personal computer (PC), a digital camera, a portable game console, an MP3 player, a Portable/Personal Multimedia Player (PMP), a handheld e-book, and the like.

Figure 2:
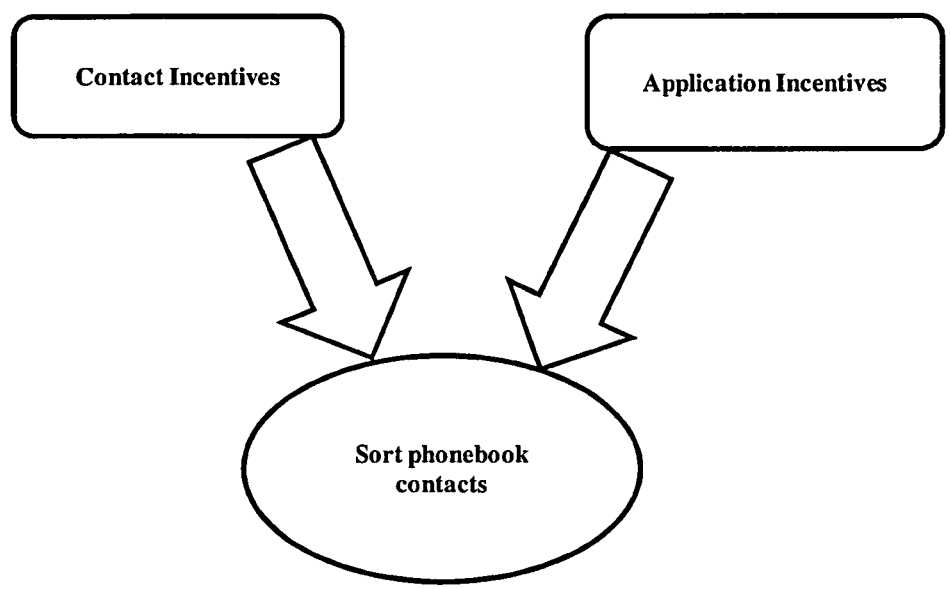
FIG. 2 illustrates an overview of a method according to an exemplary embodiment of the present invention.

FIG. 2 illustrates an overview of a method according to an exemplary embodiment of the present invention.

Referring to FIG. 2, the phonebook contacts are sorted used on the contact incentives and application incentives. A contact incentive mechanism may have a larger scope as a result of having application-wise list of incentives and also allowing weightage-based ordering within the incentives. The incentives and weightage-based ordering mechanism allows sorting of the contacts to take into account the parameters with which the user is not involved. Exemplary embodiments of the present invention allow for ordering among applications by considering the application incentive and weightage for such incentives. The incentives and weightage-based ordering mechanism may include operations such as taking into account an "amount of time the application is available in memory" and a "number of times 'phonebook' is accessed from each application". Such considerations are very relevant for modern smart-phone platforms.

According to exemplary embodiments of the present invention, the method groups similar applications with weightage into an application group. The cumulative weightage of the application group is then used for ordering of contacts. Such a consideration is important in smart-phone platforms in which user can install multiple applications corresponding to the same category. For example, with regard to social networking, the user may install Facebook, Twitter, and the like. According to exemplary embodiments of the present invention, the method groups the different social networking applications into one application for ordering the contacts. For example, the method groups the different Instant Messaging (IM) applications as one chat application for ordering the contacts. According to exemplary embodiments of the present invention, the user can use same account information to login to different instant messaging applications such as Google talk, Yahoo messenger, eBuddy messenger, and the like. In this case, the method groups such IM applications into one group as 'chat' for ordering the contacts.

FIG. 3 illustrates a set of contacts for each application according to an exemplary embodiment of the present invention.

Referring to FIG. 3, several applications such as Social Networking Service (SNS) 301, chat 302, calendar 303, gallery 304, and messenger 305 are Depicted. Several contacts are listed under each application. The contacts listed under each application represent the highly used contacts for each application. For example, contact Joys is highly used contact for SNS 301 and Joys was not used in any of the other applications. Alicia ranks 3rd in the SNS application 301, however Alicia is a highly used contact for calendar application 303. Accordingly, a contact may be listed as a highly used contact for more than one application.

Figure 4:
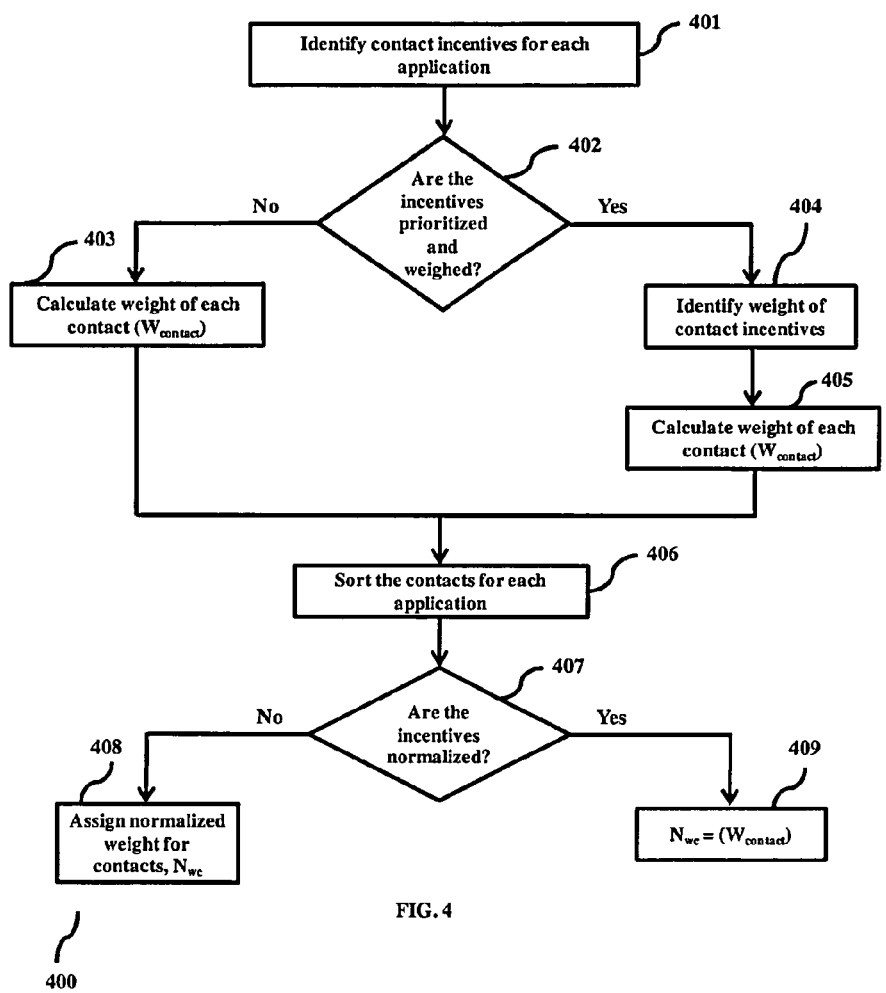
FIG. 4 illustrates a flow diagram for finding a set of contacts for each application according to an exemplary embodiment of the present invention.

FIG. 4 illustrates a flow diagram for finding a set of contacts for each application according to an exemplary embodiment of the present invention.

Referring to FIG. 4, in step 401, the contact incentives are identified for each application. The contact incentives help in weighing the contacts for each application. For example, if the application is a gallery, then the contact incentives for the application gallery can be the most tagged member (e.g., contact) in the recently uploaded photos, the most tagged member of most visited photo, the most tagged member for a particular period, the member who most visits the user's photo, the tagged member in a photo which the user visits more, and the like. Similarly, all the possible contact incentives should be identified for an application. Based on one or more or all of contact incentives identified for an application, weight for each contact for that application can be calculated.

In step 402, the method determines whether incentives are prioritized and weighed. If the method determines that the incentives are not prioritized and weighed in step 402, then the method proceeds to step 403 in which the method calculates the weight for each contact $W_{CONTACT}$ for each application as provided below in Equation (1), in which 'i' corresponds to the number of contacts, 'N' corresponds to the number of contact incentives for an application, and $A_{CONTACT\_x}$ corresponds to the number of actions for a contact incentive x performed by CONTACT.

$$W_{CONTACT} = \Sigma_{x=0}^{N} A_{CONTACT\_x} \quad \text{Equation (1)}$$

For example the method calculates the weight of contacts for an application 'Gallery' by assuming three contact incentives for gallery as Incentive 1: most tagged member in most visited photos, Incentive 2: most tagged member in recent photos, and Incentive 3: most tagged member of last week, and the like.

As an example, according to exemplary embodiments of the present invention, the weight of a contact James is determined as $W_{James}$=(Number of actions of James for Incentive1+Number of actions of James for Incentive2+Number of actions of James for Incentive 3)=35+10+25=70. Similarly, $W_{Craig}$=20+5+40=65. By comparing the above two results (e.g., the respective weightings for James and Craig), $W_{James}$ is given more weightage than $W_{Craig}$. Similarly, weight of all the contacts for an application should be calculated, and by comparing the weight of all the contacts, set of contacts of an application can be identified. The same method can be used to identify a set of contacts of all the applications.

In contrast, if the method determines that the contact incentives are prioritized and weighted identifies in step 402, then the method proceeds to step 404 in which the weight of contact incentives is identified (e.g., determined). Thereafter, the method proceeds to step 405.

In step 405, the weight of each contact $W_{CONTACT}$ is calculated by weighing each contact based on contact incentives in which the contact incentives are weighed. For example, the weight of contact incentives are taken in to account while calculating the weight of a contact.

The formula for weighing a contact based on the contact incentives, for a particular application, is shown below in Equation (2), in which 'i' corresponds to the number of contacts, and N corresponds to the number of contact incentives for an application, $W_{Incentive\_x}$ corresponds to the weight of a contact inventive x, and $A_{CONTACT\_x}$ corresponds to the number of actions for a contact incentive x.

$$W_{CONTACT} = \Sigma_{x=0}^{N} W_{Incentive\_x} * A_{CONTACT\_x} \quad \text{Equation (2)}$$

For example, the method calculates weight of contacts for an application 'Gallery' by considering the weight of contact incentives by assuming three contact incentives for gallery are identified as Incentive 1: most tagged member in most visited photos (e.g., Weight of Incentive 1 is 5), Incentive 2: most tagged member in recent photos (e.g., Weight of Incentive 2 is 3), and Incentive 3: most tagged member of last week (e.g., Weight of Incentive 3 is 7), and the like.

As an example, according to an exemplary embodiment of the present invention, by using the above formula, the weight of contact $W_{James}$ and $W_{Craig}$ are calculated. $W_{James}$ (35*5)+(10*3)(25*7)=380 and $W_{Craig}$=(20*5)+(5*3)+(40*7)=395. By comparing the above two results, $W_{Craig}$ is given more weightage than $W_{James}$. Thus, the set of contacts of each application can be identified by considering the weight of contact incentives.

In step 406, the method sorts the contacts for each application based on the weight of the contact $W_{CONTACT}$ calculated by the above two approaches respectively using Equation 1 and Equation 2.

In step 407, the method determines whether the incentives are normalized.

If the method determines that the incentives are not normalized in step 407, then the method proceeds to step 408 in which the method assigns normalized weights $N_{wc}$ for contacts. In contrast, if the method determines that the incentives are normalized in step 407, then the method proceeds to step 409 in which the method normalizes the weight of contacts $W_{CONTACT}$.

According to exemplary embodiments of the present invention, the various actions in method 400 may be performed in the order presented, in a different order or simultaneously. Further, according to exemplary embodiments of the present invention, some actions listed in FIG. 4 may be omitted.

Figure 5:
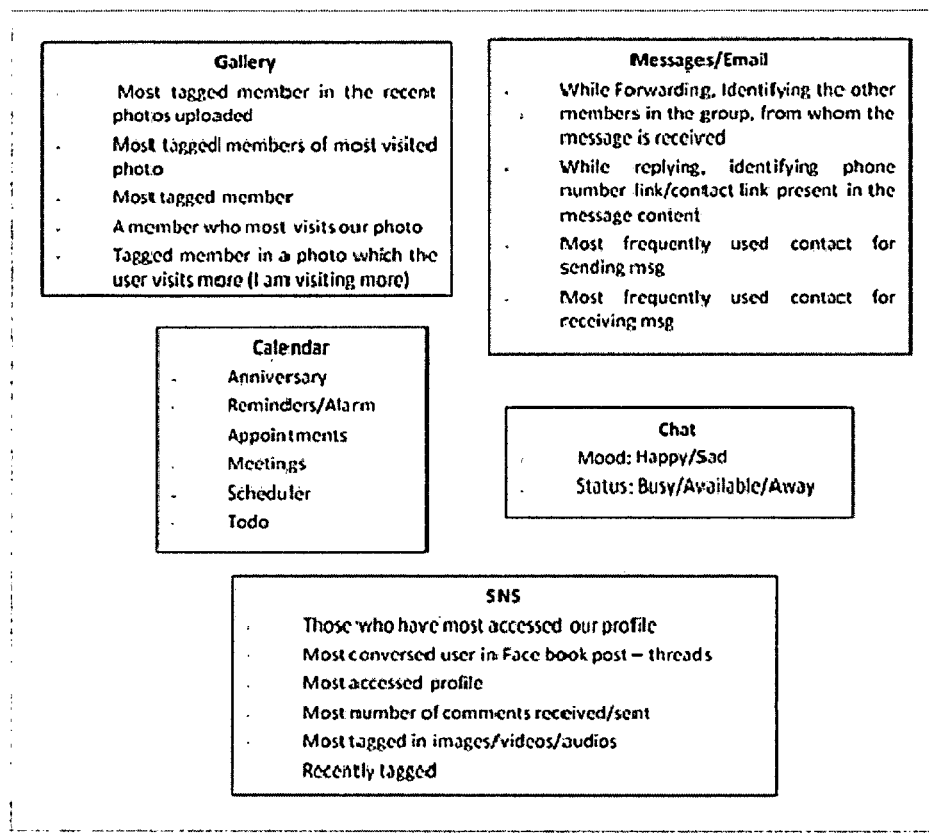
FIG. 5 illustrates contact incentives for applications according to an exemplary embodiment of the present invention.

FIG. 5 illustrates contact incentives for applications, according to an exemplary embodiment of the present invention.

Referring to FIG. 5, the contact incentives for applications such as SNS 301, chat 302, calendar 303, gallery 304, and messenger 305 are illustrated. The contact incentives differ for each application and the method uses the contact incentives to calculate the weight of each contact $W_{CONTACT}$ in each application. For example, the chat application 302 includes the contact incentives corresponding to mood and status. According to exemplary embodiments of the present invention, the mood and status may respectively signify the mood and status of the all the contacts in the chat application 302. According to exemplary embodiments of the present invention, the mood and status may respectively signify the mood and status of the user having the mobile, and a search for contacts having the same mood and status may be performed. For example, according to exemplary embodiments of the present invention, the mood can be happy or sad and the status can be available, away or busy configured by the user in the chat 302 application.

FIG. 6 illustrates weightage assigned to a set of contacts for each application according to an exemplary embodiment of the present invention.

Referring to FIG. 6, the method assigns the weight to set of contacts for each application based on the normalization. The weight calculated for each contact across different applications is based on the contact incentives identified for each application. The number of contact incentives for each application can be different. Hence, the weight of the contact found using the incentives cannot be directly compared. Accordingly, the weights should be normalized so that the weights are comparable across the applications. For example, the total number of tags found for a particular user in the gallery application cannot be compared to the total number of emails received from the user in email application. In order to compare the total number of tags found for a particular user in the gallery application with the total number of emails received for the particular user in the email application, the incentives across the applications can be normalized.

As an example, according to an exemplary embodiment of the present invention, there can be an equal weightage if the total number of tags is 8 and if number of emails received is 2. In such way, all the incentives across the applications can be normalized.

According to exemplary embodiments of the present invention, if the incentives are not normalized, then the weight of the contacts for each application can be normalized. For example, the first rankers of all the application can be given the same weightage. The figure shows that the set of contacts for each application are found and the Normalized weight for each Contact ($N_{wc}$) is identified. Based on $N_{wc}$, the set of contacts for each application is sorted. For example, the normalized weight of contact David is 5 in messenger application 305 is higher than the contact Leo in same messenger application 305. According to exemplary embodiments of the present invention, higher weights corresponding to a contact reflect the better a contact in each application.

Figure 7:
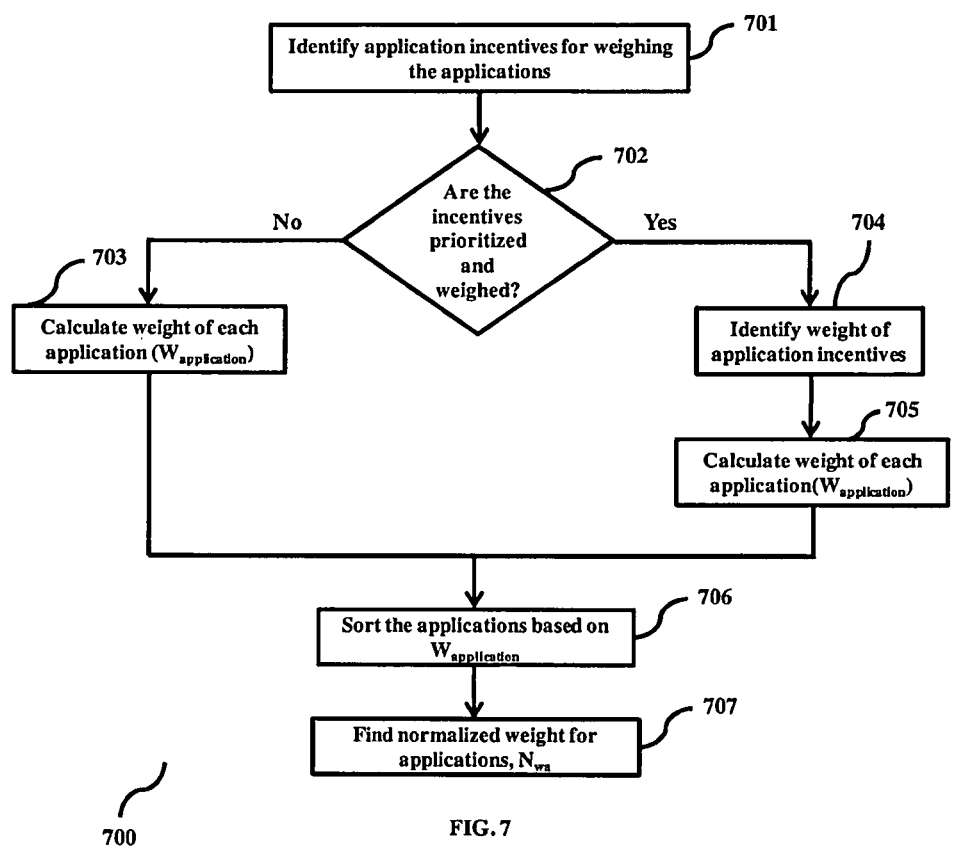
FIG. 7 illustrates a flow diagram for weighing each application according to an exemplary embodiment of the present invention.

FIG. 7 illustrates a flow diagram for weighing each application, according to an exemplary embodiment of the present invention.

Referring to FIG. 7, in step 701, the method identifies the application incentives for weighing the applications.

According to exemplary embodiments of the present invention, application incentives can be information about the application itself, which help in weighing the applications.

According to exemplary embodiments of the present invention, the application incentives can be a user intention that depicts the purpose for which the user is opening the phonebook. Such a user intention may be manually chosen such as, for example, an indication as to whether the user wants to perform SNS activity, an Email activity, or the like.

According to exemplary embodiments of the present invention, the application incentives can be determined based on the application from which the phonebook is launched. For example, if the phonebook is launched from messenger application 305, the user will more likely use the phonebook to identify the contacts for sending messages or other messenger application activity.

According to exemplary embodiments of the present invention, the application incentives can be determined based on amount of time an application is available in memory. For example, if an application occupies the memory for a long period of time, the application may be assumed to be used by the user for a long time. In recent smart phones, a process called 'low-memory-killer' exists, which identifies the applications or processes which are not being used by the user but which use the memory. The 'low-memory-killer' process will kill (e.g., terminate) the processes or applications that are not being used by the user but which nonetheless use the memory. Hence, if an application spends more time in memory and is not killed, then the application is assumed to be used by the user for a greater amount of time. As a result, the application can be given more priority.

According to exemplary embodiments of the present invention, the application incentives can be determined based on a number of times 'phonebook' is accessed from each application. Based on the number of times the phonebook is accessed from each application, the method may determine the application which uses the phonebook most. Similarly, all the application incentives, which help in weighing the applications, should be identified. Based on one or more or all of application incentives, the applications can be weighed.

In step 702, the method determines whether the application incentives are prioritized and weighed.

If the method determines that the incentives are not prioritized and weighed in step 702, then the method proceeds to step 703 in which the method calculates the weight of the application $W_{APPLICATION}$ as provided below in Equation (3), in which 'i' corresponds to the number of contacts, 'N' corresponds to the number of contact incentives for an application, and $A_{APPLICATION\_x}$ corresponds to the number of actions of APPLICATION. Thereafter, the method proceeds to step 706.

$$W_{APPLICATION} = \Sigma_{x=0}^{N} A_{APPLICATION\_x} \quad \text{Equation (3)}$$

In contrast, if the method determines that the application incentives are prioritized and weighed in step 702, then the method proceeds to step 704 in which the method identifies the weight of the application incentives.

Then the method calculates in step 705 the weight of the application by considering the weight of the incentives as provided below in Equation (4), in which 'i' corresponds to the number of contacts, 'N' corresponds to the number of contact incentives for an application, $W_{Incentive\_x}$ corresponds to the weight of a contact inventive x, and $A_{APPLICATION\_x}$ corresponds to the number of actions of APPLICATION. Thereafter, the method proceeds to step 706.

$$W_{APPLICATION} = \Sigma_{x=0}^{N} W_{Incentive\_x} * A_{APPLICATION\_x} \quad \text{Equation (4)}$$

In step 706, the method sorts the applications.

Thereafter, in step 707, the method assigns Normalized Weight of an Application ($N_{WA}$) which can be the weight of the application $W_{APPLICATION}$ itself. The normalized weight can also be newly assigned based on the sorted order.

According to exemplary embodiments of the present invention, various actions in method 700 may be performed in the order presented, in a different order or simultaneously. Further, according to exemplary embodiments of the present invention, some actions listed in FIG. 7 may be omitted.

FIG. 8 illustrates weightage assigned to each application, according to an exemplary embodiment of the present invention.

Referring to FIG. 8, the $N_{WA}$ can be the weight of the application $W_{APPLICATION}$ itself or the weight of application $W_{APPLICATION}$ by considering the weight of the application. The normalized weight can also be newly assigned based on the sorted order. The figure shows that $N_{WA}$ for the applications such as SNS 301, chat 302, calendar 303, gallery 304, and messenger 305 which are sorted based on $N_{WA}$.

Figure 9:
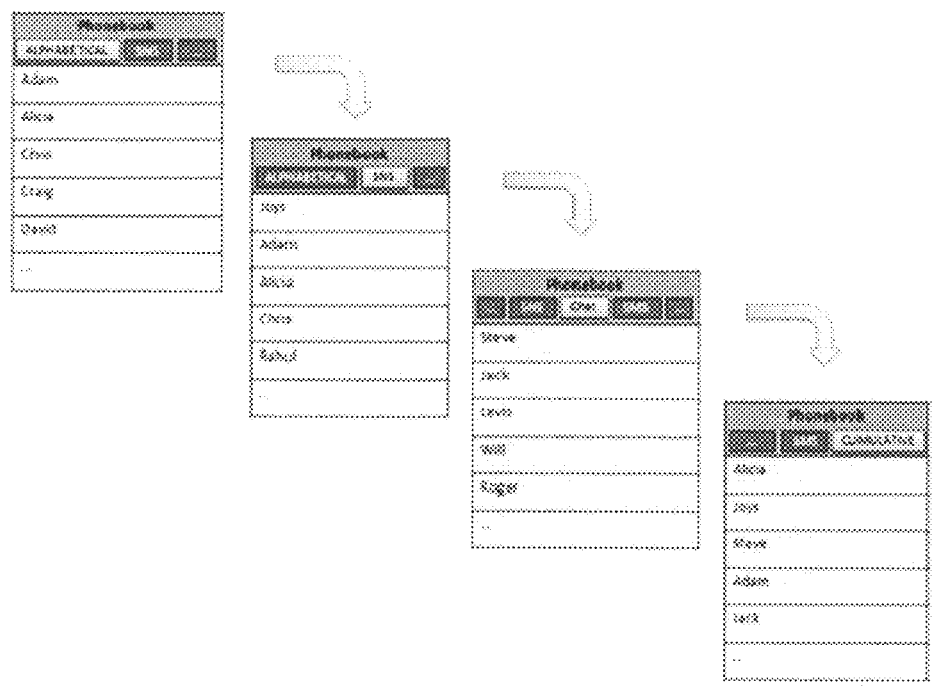
FIG. 9 illustrates a method of selecting applications which is intended by a user according to an exemplary embodiment of the present invention.

FIG. 9 illustrates a method of selecting applications which is intended by a user according to an exemplary embodiment of the present invention.

Referring to FIG. 9, a user intention application incentive can be manually chosen by the user.

For example, as illustrated in FIG. 9, the user may select the application which the user intends to use. The user can be given an option to select the application in tabs or menus provided in the phonebook application itself. Based on the application chosen, the phonebook contacts can be sorted. According to an exemplary embodiment of the present invention, irrespective of the weights found for the application using application incentives, the application identified as the application which the user intends to use can be given the highest priority. For example, if the user intends to select the chat application 302 in the display, then the user can see the contacts available under the chat application 302. The cumulative section shown in the figure illustrates the collection of both the contact incentives and application incentives. The cumulative list is determined from the weight of the contact $W_{CONTACT}$ and weight of application $W_{APPLICATION}$ calculated in previous figures.

Figure 10:
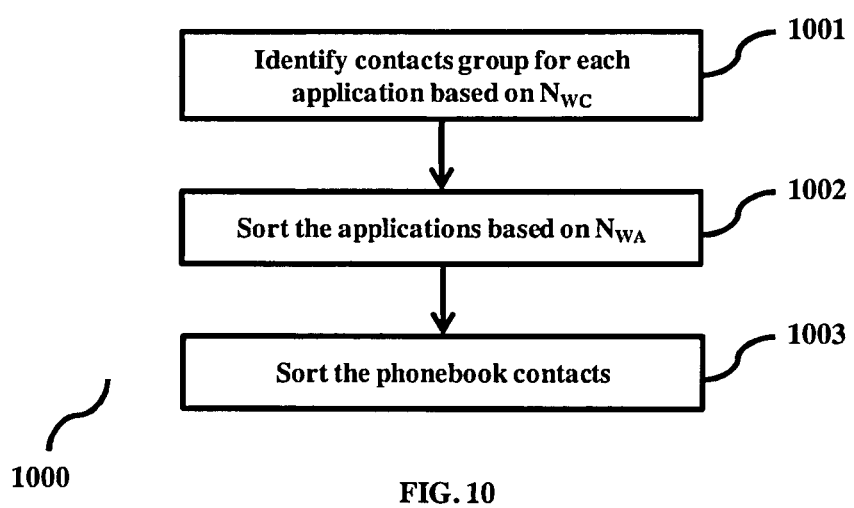
FIG. 10 illustrates a flow diagram for sorting phonebook contacts according to an exemplary embodiment of the present invention.

FIG. 10 illustrates a flow diagram for sorting phonebook contacts according to an exemplary embodiment of the present invention.

Referring to FIG. 10, in step 1001, the method identifies the contact group for each application based on a determined normalized contact $N_{WC}$.

Thereafter, in step 1002, the method sorts the applications based on $N_{WA}$.

In step 1003, the method sorts the phonebook contacts by placing the sorted contacts group based on the sorted order of applications.

According to exemplary embodiments of the present invention, various actions in method 1000 may be performed in the order presented, in a different order or simultaneously. Further, according to exemplary embodiments of the present invention, some actions listed in FIG. 10 may be omitted.

Figure 11:
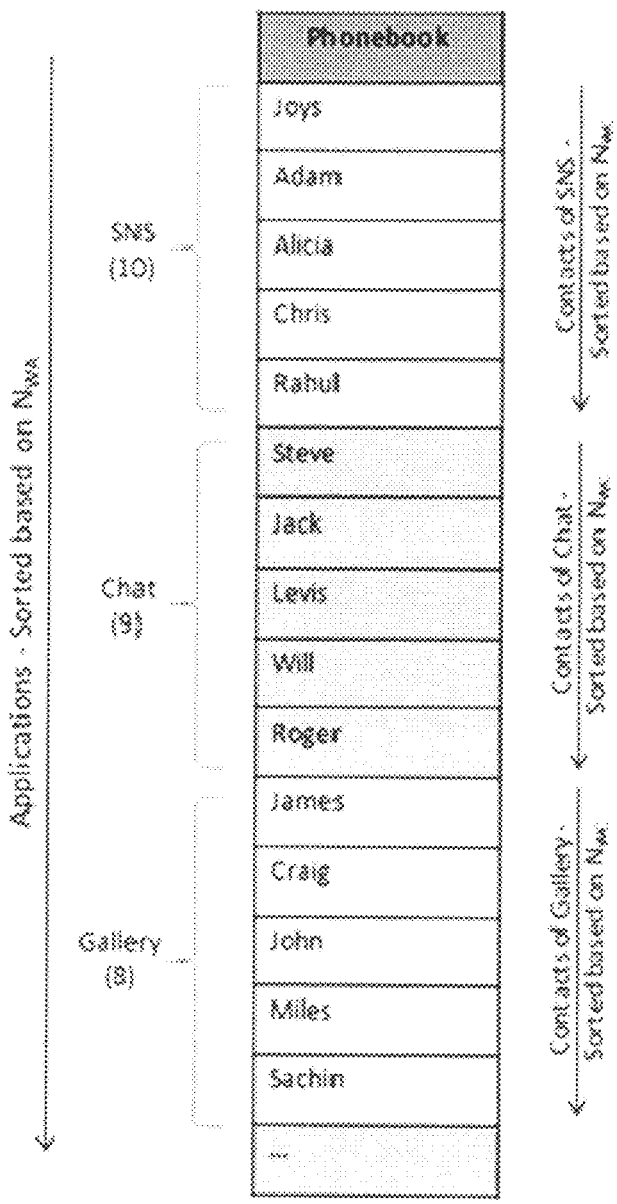
FIG. 11 illustrates a sorted set of contacts in a phonebook according to an exemplary embodiment of the present invention.

FIG. 11 illustrates a sorted set of contacts in a phonebook according to an exemplary embodiment of the present invention.

Referring to FIG. 11, the contacts are sorted in the phonebook based on a normalized weight of the contact $N_{WC}$ and a normalized weight of the applications $N_{WA}$.

For example, according to exemplary embodiments of the present invention, SNS application 301 whose weightage is 10 is given the highest priority and is shown first in the phonebook contacts. The first five contacts shown in the phonebook are the set of contacts identified for the SNS application 301.

Similarly, chat application 302 whose weightage is 9 is given the next priority and the set of contacts of the chat application 302 is shown as the next five contacts in the phonebook. The set of contacts of the chat application 302 are then followed by other applications based on the sorted order. Accordingly, the user can easily identify the contacts under each application and select the contacts whenever necessary.

Figure 12:
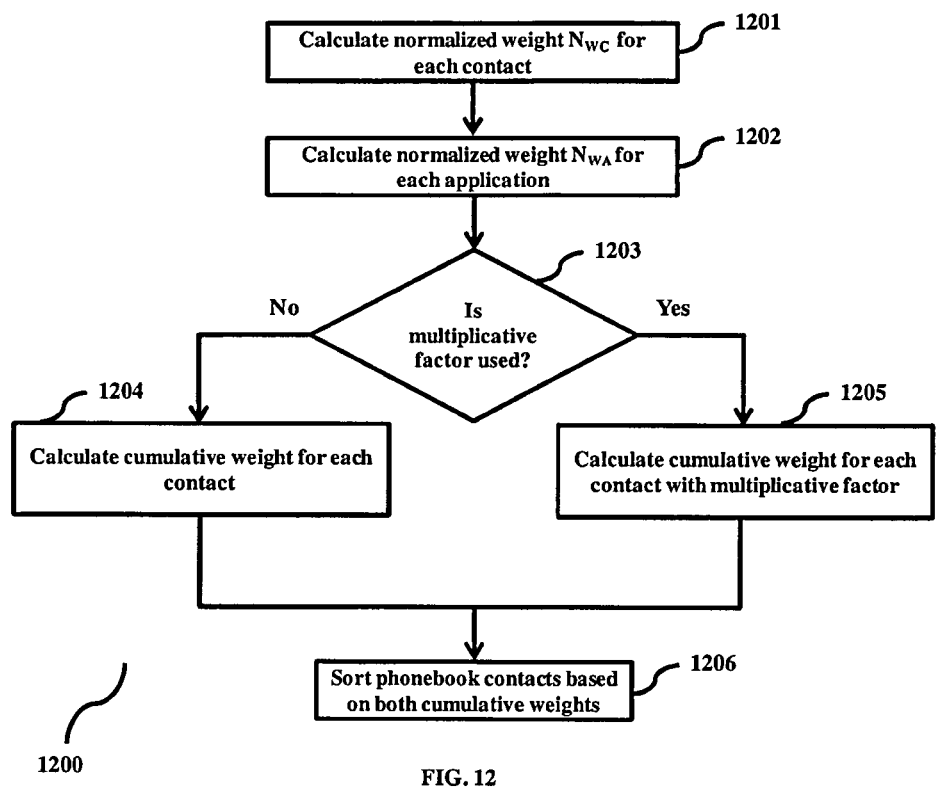
FIG. 12 illustrates a flow diagram for sorting phonebook contacts based on cumulative weight according to an exemplary embodiment of the present invention.

FIG. 12 illustrates a flow diagram for sorting phonebook contacts based on cumulative weight according to an exemplary embodiment of the present invention.

According to exemplary embodiments of the present invention, the phonebook contacts are sorted based on cumulative weight.

Referring to FIG. 12, in step 1201, the method calculates the normalized weight of the contact $N_{WC}$.

In step 1202, the method calculates the normalized weight of the applications $N_{WA}$.

In step 1203, the method determines whether any multiplication factor is used.

If the method determines that no multiplication factor is used in step 1203, then the method proceeds to step 1204 in which the method calculates the cumulative weight for each contact $N_{CUMULATIVE}$ without considering the multiplication factor as shown below in Equation (5), in which N corresponds to the number of applications, $N_{WC}$ corresponds to the normalized weight for contact x, and $N_{WA}$ corresponds to the normalized weight of the application for contact x, and where x corresponds to the contact for whom the cumulative weight is calculated.

$$N_{CUMULATIVE\_x} = \Sigma_{x=0}^{N} N_{WA\_x} * N_{WC\_x} \quad \text{Equation (5)}$$

For example, $W_{Joys} = (10*5)+0+0+(7*1)+0=57$ where, '$W_{Joys}$' is the cumulative weight of a contact Joys, (10*5): '10' is the $N_{WA}$ of SNS (e.g., from FIG. 8), '5' is the $N_{WC}$ of Joys in SNS application (from FIG. 6), '0' means that the contact is not included in the set of contacts for that application, (7*1): '7' is the $N_{WA}$ of Calendar, '1' is the $N_{WC}$ of Joys in calendar application 303 respectively.

Similarly, $W_{Alicia} = (10*3)+0+(7*5)+0+(1*2)=67$

Hence, the cumulative weight for the contacts Joys and Alicia are determined. By comparing the cumulative weight of the contacts, Alicia (e.g., $N_{CUMULATIVE\_Alicia}=67$) is given more weightage than Joys (e.g., $N_{CUMULATIVE\_Joys}=57$).

In contrast, if the method determines that the multiplication factor is used in step 1203, then the method proceeds to step 1205 in which the method calculates the cumulative weight for each contact by considering the multiplication factor.

According to exemplary embodiments of the present invention, the multiplication factor can be used to give more priority to the applications. The multiplication factor is a constant used for all the applications. However, based on $N_{WA}$ found for the applications, the multiplication factor will have major effect. The method calculates cumulative weight for each contact by considering the multiplication factor is shown below in Equation (6), in which $N_{M\_CUMULATIVE}$ is the final weight found for each contact, 'i' is the number of contacts, N corresponds to the number of applications, $N_{WC}$ corresponds to the normalized weight for contact x, and $N_{WA}$ corresponds to the normalized weight of the application for contact x, x corresponds to the contact for whom the cumulative weight is calculated, and MF is a multiplication factor constant.

$$N_{M\_CUMULATIVE\_x} = \Sigma_{x=0}^{N} (N_{WA\_x} * MF) * N_{WC\_x} \quad \text{Equation (6)}$$

In step 1206, the method compares the cumulative weight identified for each contact and sorts the phonebook contacts. For example, the cumulative weight of few contacts are calculated by considering the multiplication factor as '5' as shown below $W_{Joys} = ((10*5)*5)+0+0+((7*5)*1)+0=285$ $W_{Alicia} = ((10*5)*3)+0+((7*5)*5)+0+((1*5)*2)=335$ Comparing the above two values, the contact Alicia is given more weightage than the contact Joys. By calculating the cumulative weights of all the contacts, the phonebook contacts can be sorted.

According to exemplary embodiments of the present invention, various actions in method 1200 may be performed in the order presented, in a different order or simultaneously. Further, according to exemplary embodiments of the present invention, some actions listed in FIG. 12 may be omitted.

FIG. 13 illustrates a diagram of sorted applications based on a multiplication factor, according to exemplary embodiments as disclosed herein.

Referring to FIG. 13, the normalized weight $N_{WA}$ for each application based on Multiplication Factor (MF) may be calculated. For example, SNS application 301 the normalized weight $N_{WA}$ is determined as value 10 and the normalized weight is multiplied by the MF (5) then for SNS application 301 the value ($N_{WA}*MF$) will be 50.

Figure 14:
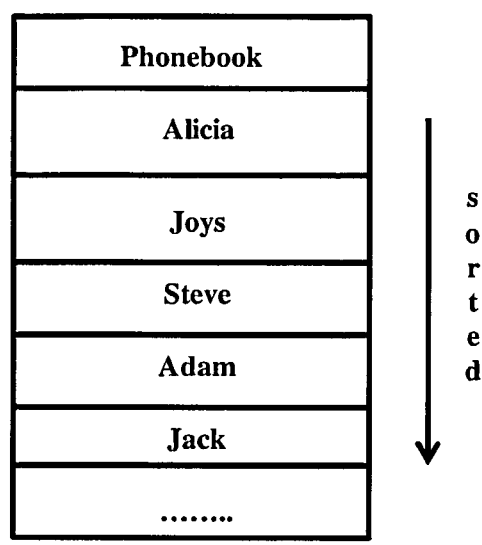
FIG. 14 illustrates a diagram of sorted contacts based on cumulative weight according to an exemplary embodiment of the present invention.

FIG. 14 illustrates a diagram of sorted contacts based on cumulative weight according to an exemplary embodiment of the present invention.

Referring to FIG. 14, the sorted phonebook contacts are depicted by considering the cumulative weight for all the contacts. For example, the normalized weight of the contact Alicia is determined and also the normalized weight of application for which the contact Alicia is present is determined. Based on the results, the cumulative weight of the contact Alicia is determined and sorted accordingly. Similarly, for all the contacts the method finds the cumulative weight and then sorts the phonebook.

Figure 15:
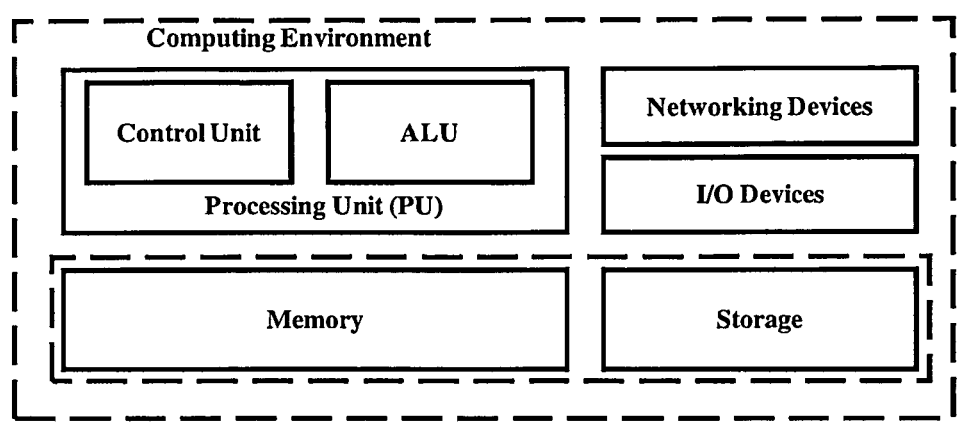
FIG. 15 illustrates a computing environment implementing an application according to an exemplary embodiment of the present invention.

FIG. 15 illustrates a computing environment implementing an application according to an exemplary embodiment of the present invention.

Referring to FIG. 15, the computing environment comprises at least one processing unit that is equipped with a control unit and an Arithmetic Logic Unit (ALU), a memory, a storage unit, at least one networking device, and at least one Input/Output (I/O) device.

The processing unit is responsible for processing the instructions of the algorithm. The processing unit receives commands from the control unit in order to perform its processing. Further, any logical and arithmetic operations involved in the execution of the instructions are computed with the help of the ALU.

The overall computing environment can be composed of multiple homogeneous and/or heterogeneous cores, multiple CPUs of different kinds, special media and other accelerators. The processing unit is responsible for processing the instructions of the algorithm. The processing unit receives commands from the control unit in order to perform its processing. Further, any logical and arithmetic operations involved in the execution of the instructions are computed with the help of the ALU. Further, the plurality of process units may be located on a single chip or over multiple chips.

The algorithm comprising of instructions and codes required for the implementation are stored in either the memory unit or the storage or both. At the time of execution, the instructions may be fetched from the corresponding memory and/or storage, and executed by the processing unit.

In case of any hardware implementations various networking devices or external I/O devices may be connected to the computing environment to support the implementation through the networking unit and the I/O device unit.

Exemplary embodiments of the present invention disclosed herein can be implemented through at least one software program running on at least one hardware device and performing network management functions to control the elements. The elements shown in FIGS. 1 and 15 include blocks which can be at least one of a hardware device, or a combination of hardware device and software module.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for sorting phonebook contacts by a communication device, the method comprising:
    collecting, by at least one processor of the communication device, contact incentives related to an application stored in the communication device;
    calculating, by the at least one processor, first weights applied to each of contacts related to the application based on the contact incentives and second weights pre-stored for each of the contact incentives;
    normalizing, by the at least one processor, the first weights;
    assigning, by the at least one processor, the normalized weights to each of the contacts, and applying the normalized weights to the contacts;
    sorting, by the at least one processor, the contacts based on the applied result of the normalized weights; and
    controlling, by the at least one processor, a display of the communication device to display the sorted contacts.

2. The method of claim 1, further comprising:
    collecting, by the at least one processor, application incentives for each of applications stored in the communication device; and
    calculating, by the at least one processor, third weights corresponding to each of the applications based on the application incentives.

3. The method of claim 2, further comprising:
    obtaining, by the at least one processor, values by normalizing the third weights.

4. The method of claim 3, further comprising sorting, by the at least one processor, the contacts based on the values.

5. The method of claim 1, further comprising:
    calculating, by the at least one processor, cumulative weights for each of the contacts based on the normalized weights; and
    sorting, by the at least one processor, the contacts based on the cumulative weights.

6. The method of claim 5,
    wherein each of the cumulative weights are calculated based on a multiplication factor of the application.

7. The method of claim 1, further comprising:
    grouping, by the at least one processor, similar applications stored in the communication device as collective applications;
    calculating, by the at least one processor, cumulative weights for each of the collective applications; and
    sorting, by the at least one processor, the contacts based on the cumulative weights.

8. The method of claim 1, further comprising:
    if the contact incentives related to the application are updated, calculating, by the at least one processor, weights applied to each of the contacts related to the application based on the updated contact incentives and the second weights;
    determining, by the at least one processor, whether normalization of the calculated weight is needed; and
    if the normalization of the calculated weight is needed, normalizing, by the at least one processor, the calculated weight.

9. A communication device for sorting phonebook contacts, the communication device comprising:

a display;

an integrated circuit comprising at least one processor; and at least one memory having a computer program code, wherein the at least one memory and the computer program code are configured to direct the at least one processor to cause the communication device to:

collect contact incentives related to an application stored in the communication device, calculate first weights applied to each of the contacts related to the application based on the contact incentives and second weights pre-stored for each of the contact incentives, normalize the first weights, assign the normalized weights to each of the contacts, and apply the normalized weights to the contacts, sort the contacts based on the applied result of the normalized weights, and control the display to display the sorted contacts.

10. The communication device of claim 9, wherein the at least one processor is further configured to:

collect application incentives for each of applications stored in the communication device, and calculate third weights corresponding to each of the applications based on the application incentives.

11. The communication device of claim 10, wherein the at least one processor is further configured to obtain values by normalizing the third weights.

12. The communication device of claim 11, wherein the at least one processor is further configured to sort the contacts based on the values.

13. The communication device of claim 11, wherein the at least one processor is further configured to:

calculate cumulative weights for each of the contacts based on the normalized weights, and sort the contacts based on the cumulative weights.

14. The communication device of claim 13, wherein each of the cumulative weights are calculated based on a multiplication factor of the application.

15. The communication device of claim 9, wherein the at least one processor is further configured to:

group similar applications stored in the communication device as collective applications, calculate cumulative weights for each of the collective applications, and sort the contacts based on the cumulative weights.

16. The communication device of claim 9, wherein the at least one processor is further configured to:

if the contact incentives related to the application are updated, calculate weights applied to each of the contacts related to the application based on the updated contact incentives and the second weights, determine whether normalization of the calculated weight is needed, and if the normalization of the calculated weight is needed, normalize the calculated weight.

* * * * *